May 13, 1958     J. M. BLEUENSTEIN     2,834,741
SAND COATING
Filed May 12, 1954
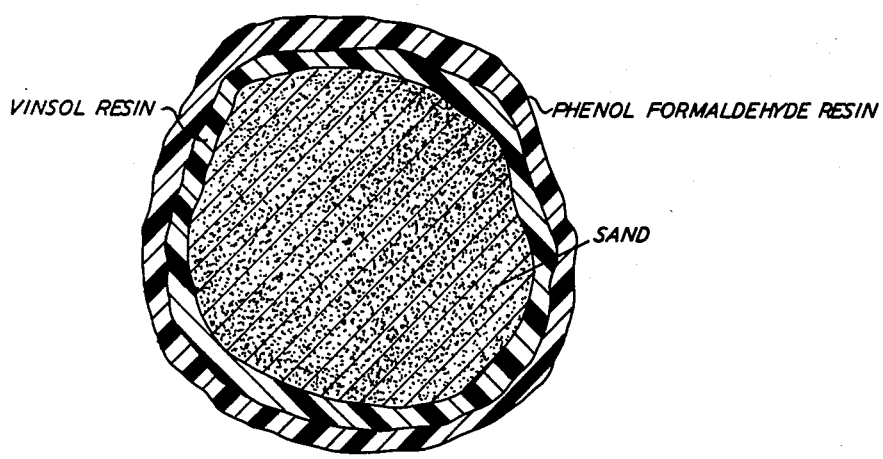
J.M. BLEUENSTEIN
INVENTOR.
E. C. McRae
BY J. R. Faulkner
J. H. Oster
ATTORNEYS

United States Patent Office 2,834,741
Patented May 13, 1958

2,834,741

SAND COATING

Julius M. Bleuenstein, Dearborn, Mich., assignor to Ford Motor Company, Dearborn, Mich., a corporation of Delaware Application May 12, 1954, Serial No. 429,385

5 Claims. (Cl. 260—25)

This invention lies in the founding field and is especially concerned with improvements designed to reduce the cost of sand employed in the well-known shell molding procedure.

It was early learned in shell molding that the presence of common impurities in sand such as naturally occurring clay or organic matter or the carbonaceous residue from used sands tend to greatly weaken the strength of a sand containing a given amount of resin or conversely, to increase the amount of resin necessary to obtain a desired strength.

It has been discovered that it is possible to render these impurities innocuous by the use of a small amount of high melting plastic or thermo set plastic and enable the sand so treated to be employed as a shell molding material with an overall greatly decreased amount of resin. To accomplish this result the sand containing the impurities is thoroughly coated hot with a very high melting plastic or a thermo set plastic is produced in situ coating each individual grain of sand. This coating of a high melting plastic or a thermo set plastic around each individual sand grain has the effect of tieing up the clay or other impurities in the sand which are detrimental to the strength of the final mold.

A particularly economical way of coating impure sands is to mull them in a hot muller at a temperature of from 300 to 500° F. with a natural resin known to the trade as Vinsol and adding to the mixture sufficient hexamethylenetetramine to raise the melting point of the coating to the desired point.

The temperature of the muller is above the melting point of the Vinsol so the Vinsol melts and coats each sand grain before its melting point is raised by reaction with hexamethylenetetramine. This sand may then be employed in any of the conventional shell molding processes without further alteration.

However, it is preferred to combine this operation with a further coating of the sand grains for reasons of economy. A typical run using this combined procedure employed 38 pounds of bank sand heated to 360° F. and mulled for 6 minutes with 275 grams of Vinsol and 10 grams of hexamethylenetetramine. This hot sand was placed in a cool muller and when the temperature had dropped sufficiently, there was added 300 grams of a water soluble A stage resin containing 70 percent solids by weight together with 50 grams of hexamethylenetetramine. Mulling was continued until a dry, dust-free, free-flowing sand was obtained.

Another typical mix included 38 pounds of bank sand heated to 310° F. and placed in a hot muller together with 275 grams of Vinsol and 30 grams of hexamethylenetetramine. This was mulled and became almost pulverulent due to the reaction of Vinsol and the hexamethylenetetramine. This hot mix was placed in a cool muller together with 300 grams of ammonium chloride catalyzed liquid Novalak containing .7 mole of formaldehyde to one mole of phenol together with 50 grams of hexamethylenetetramine. Thirty grams of magnesium stearate was added as a lubricant. After mulling to a dry granular material this produced a sand setting in about 20 seconds for a ¼ inch section at 450° F.

If it is desired to produce a strong dump box type sand, the melting point must be raised sufficiently that the sand will not peel away from the vertical surfaces of the heated pattern while the shell is being formed. A typical dump box sand may be formed as follows: A quantity of bank sand was heated to 450° F. and mulled together with 2 percent by weight of Vinsol and hexamethylenetetramine in an amount equal to 10 percent by weight of the Vinsol. In about 4 minutes the Vinsol and hexamethylenetetramine reacted sufficiently to raise the melting point of the resin above the temperature of the batch and consequently a powder resulted. To the hot sand there was then added 1 percent by weight of Novalak and in the course of one minute's mulling the sand was wetted. This wetted mass is transferred to a cool muller and there mulled with 1 percent by weight of water soluble A stage resin plus hexamethylenetetramine to the extent of 20 percent of the weight of Vinsol. This mixture quickly mulled to a powder and a trace of magnesium stearate was then added as a lubricant. This produced a satisfactory dump box sand.

As a further typical example, 2 percent of Vinsol and 2 percent of hexamethylenetetramine was mulled to a powder in 450° F. sand. To this hot dry powder was added 2.7 percent Novalak resin and the mulling continued for 2 minutes. This mass was transferred to a cooling muller and when the temperature had dropped to 230° F. 68 grams of hexamethylenetetramine and 15 grams of magnesium stearate was added. This produced a satisfactory dump box sand. It will be seen that in this last procedure the sand was coated by the high melting reaction product of the Vinsol and hexamethylenetetramine and that the heat stable Novalak resin was coated over the Vinsol resin surrounding the sand grains. Due to the intense reaction between the Vinsol and the hexamethylenetetramine, no hexamethylenetetramine was available to catalyze the setting of the Novalak. However, after the temperature had dropped 230° F., the additional hexamethylenetetramine was mulled into the Novalak with no danger of reaction.

This invention is not limited to Vinsol but is applicable to any high melting natural or synthetic material which reacts readily with hexamethylenetetramine to give a much higher melting or infusible substance.

I claim as my invention:

1. The process of preparing a sand suitable for use in shell molding comprising agitating together Vinsol comprising a dark colored, hard, pine resin which is substantially insoluble in petroleum hydrocarbons and which has a methoxy content of 3 to 7 percent and sand heated to a temperature of 300 to 500° F. until the Vinsol has melted and coated each sand grain, exposing the heated and Vinsol coated grains to hexamethylenetetramine to produce a higher melting resin, permitting this reaction to occur, at least partially cooling the resin coated sand and agitating the cooled sand with a heat settable resin.

2. The process of preparing a sand suitable for use in shell molding comprising agitating together Vinsol comprising a dark colored, hard, pine resin which is substantially insoluble in petroleum hydrocarbons and which has a methoxy content of 3 to 7 percent and sand heated to a temperature of 300 to 500° F. until the Vinsol has melted and coated each sand grain, exposing the heated and Vinsol coated grains to hexamethylenetetramine, permitting the Vinsol coating and hexamethylenetetramine to react to produce a higher melting coating, at least partially cooling the resin coated sand and agitating the cooled sand with a heat settable resin.

3. The process of preparing a sand suitable for use in shell molding comprising mulling together Vinsol comprising a dark colored, hard, pine resin which is substantially insoluble in petroleum hydrocarbons and which has a methoxy content of 3 to 7 percent and sand heated to a temperature of 300 to 500° F. until the Vinsol has melted and coated each sand grain, exposing the heated and Vinsol coated grains to hexamethylenetetramine, permitting the Vinsol coating and hexamethylenetetramine to react to produce a higher melting coating, at least partially cooling the sand and mulling into the cooled sand a heat settable phenol aldehyde resin and catalyst.

4. A shell molding sand in which each sand grain is coated with a layer of the reaction product of Vinsol comprising a dark colored, hard, pine resin which is substantially insoluble in petroleum hydrocarbons and which has a methoxy content of 3 to 7 percent and hexamethylenetetramine, said layer being in turn coated with a separate layer of a heat-settable resin.

5. A shell molding sand in which each sand grain is coated with a layer of the reaction product of Vinsol comprising a dark colored, hard, pine resin which is substantially insoluble in petroleum hydrocarbons and which has a methoxy content of 3 to 7 percent with hexamethylenetetramine which layer is in turn coated with a layer of a heat settable phenol-aldehyde resin containing a catalyst.

References Cited in the file of this patent
UNITED STATES PATENTS

| | | |
|---|---|---|
| 2,203,471 | Ray | June 4, 1940 |
| 2,444,413 | Weston | July 6, 1948 |
| 2,448,624 | Rummelsburg | Sept. 7, 1948 |
| 2,614,946 | Proudfoot | Oct. 21, 1952 |
| 2,662,067 | Less et al. | Dec. 8, 1953 |
| 2,692,246 | Less et al. | Oct. 19, 1954 |
| 2,714,076 | Seckel | July 26, 1955 |
| 2,776,914 | Faulwetter | Jan. 8, 1957 |